United States Patent
Adams et al.

[15] 3,697,152
[45] Oct. 10, 1972

[54] TUNING METHOD FOR PLURAL LAYER LIQUID CRYSTAL FILTERS

[72] Inventors: James E. Adams, Ontario; Lewis B. Leder, Rochester, both of N.Y.

[73] Assignee: Xerox Corporation, Stamford, Conn.

[22] Filed: Jan. 6, 1971

[21] Appl. No.: 104,368

[52] U.S. Cl. ............350/158, 350/160 LC, 350/316
[51] Int. Cl. ................................................G02f 1/24
[58] Field of Search..........350/160, 150, 1, 158, 316; 250/83.3 HP

[56] References Cited

OTHER PUBLICATIONS

Fergason, Molecular Crystals, Vol. 1, 1966, pp. 293–307

Primary Examiner—David Schonberg
Assistant Examiner—Ronald J. Stern
Attorney—James J. Ralabate, David C. Petre and Gaetano D. Maccarone

[57] ABSTRACT

A method for tuning optical devices constructed with one or more liquid crystal films possessing optically negative characteristics which comprises rotating the liquid crystal films with respect to the beam of incident light.

8 Claims, 5 Drawing Figures

INVENTORS
JAMES E. ADAMS
LEWIS B. LEDER

TUNING METHOD FOR PLURAL LAYER LIQUID CRYSTAL FILTERS

BACKGROUND OF THE INVENTION

This invention relates to optical devices constructed with liquid crystal films having optically negative characteristics and more particularly to a method for tuning such optical devices.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are some times referred to as mesophases thereby indicating that they are states of matter intermediate between the liquid and crystalline states. The three mesophase forms of liquid crystals mentioned above are characterized by different physical structures wherein the molecules of the compound are arranged in a molecular structure which is unique to each of the three mesomorphic structures. Each of these structures is well known in the liquid crystal art.

Optical filters are well known and widely used devices some of which can be constructed to essentially completely transmit substantially all wavelengths of incident light radiation while simultaneously rejecting a band of undesired wavelengths. Conversely others can be constructed to essentially completely reject all wavelengths of incident light radiation while simultaneously transmitting only a band of desired wavelengths. The former type may be referred to as optical notch filters while the latter are commonly referred to as band pass filters. One type of prior art band pass filters, called interference filters, typically comprises alternating layers of dielectric material having a relatively high index of refraction and a dielectric material having a relatively low index refraction. By making the layers of the proper thickness, the reflections of certain bands of wavelengths from the boundaries between the materials are reinforced and thereby removed from the transmitted beam. The other wavelengths which are grouped together in a plurality of orders of widely spaced bands pass through the material.

It is known in the art how to "tune" this filters. of prior art band pass filter, that is, to shift the wavelength regions at which these filters reject certain wavelength bands or transmit desired wavelength bands, by tilting the filter so as to change the angular incidence of the light beam directed upon the filter. Generally speaking, however, these prior art optical filters are quite sensitive to small changes in the angular incidence of the light beam thus resulting in large changes in color for relatively small rotation of the filter. A further characteristic is that the bandwidth of the transmitted band of wavelengths deteriorates rapidly when the filter is rotated and, consequently, the filter cannot be rotated over a relatively large wavelength span thus limiting the effectiveness of this technique with respect to these prior art filter.

Recent advances in liquid crystal technology have brought about the discovery that liquid crystalline substances having optically negative characteristics, are extremely useful when utilized in optical filter systems. Detailed descriptions of an optical notch filter system and a band pass filter system respectively utilizing such liquid crystalline substances are given in copending applications, Ser. No. 104,369, filed on Jan. 6, 1971 and Ser. No. 104,367, filed on Jan. 6, 1971 both entitled "Optical Filter System," both having a common assignee and both having a filing date the same as the filing date of this instant application. Furthermore, in new and growing areas of technology, such as, liquid crystal optical systems, new methods, apparatus and articles of manufacture are often discovered for the application of the new technology in a new mode. It would be desirable to have a method for tuning optical devices employing liquid crystal films having optically negative properties for such a method would make it possible to adapt these devices for various specific conditions thereby broadening their versatility and increasing their numerous advantageous characteristics.

SUMMARY OF THE INVENTION

It is, therefore, an object of this invention to provide the above-noted desirable features.

It is another object of the invention to provide a method whereby any optical device employing liquid crystal films having optically negative characteristics can be tuned.

It is a further object of the invention to provide a method for shifting the $\lambda o$ value of liquid crystal films having optically negative characteristics.

The foregoing and other objects and advantages are realized in accordance with the invention by rotating these optical devices themselves, or the liquid crystal films independently of the other members of the devices, with respect to the angular incidence of the beam of incident light. Furthermore, in those optical devices which have a plurality of liquid crystal films, the individual films may be rotated independently or they may be rotated in tandem to achieve various desired results as will be discussed in detail hereinafter.

Birefringence, also referred to as double refraction, is an optical phenomenon characteristic of some solid crystals and most liquid crystal substances. When a beam of unpolarized light strikes a birefringent substance, it is split into two polarized components whose transverse vibrations are at right angles to each other. The two components are refracted at different angles through the substance and emerge as beams of polarized light. By the term "liquid crystalline substance which has optically negative properties" as used herein is meant one for which the extraordinary index of refraction $n_E$ is smaller than the ordinary index of refraction $n_O$. For a detailed description of this phenomenon see *Optical Crystallography*, Wahlstrom, 4th Edition, Wiley and Sons, New York.

Cholesteric liquid crystal substances exhibit optically negative characteristics. The molecules in cholesteric liquid crystals are arranged in very thin layers with the long axes of the molecules parallel to each other and to the plane of the layers within each layer. Because of this configuration of the molecules the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Struc-*

*ture and the Properties of Liquid Crystals*, G. W. Gray, Academic Press, 1962.

Cholesteric liquid crystals have the property that when the propagation direction of plane polarized or unpolarized light is along the helical axis thereof, white light is essentially unaffected in transmission through thin films of such liquid crystals except for a wavelength region centered about some wavelength $\lambda o$ where $\lambda o$ equals $2\ np$ with $n$ representing the index of refraction of the liquid crystal substance and $p$ the pitch or repetition distance of the helical structure. For light of a wavelength $\lambda o$ the cholesteric liquid crystal, under these conditions, exhibits selective reflection of the light such that approximately 50 percent of the light in this region is reflected and approximately 50 percent is transmitted (assuming negligible absorption which is usually the case) with both the reflected and transmitted beams being approximately circularly polarized. For light having wavelengths around $\lambda o$ but not at $\lambda o$ the same effect is present but not completely. The transmitted light is not circularly polarized but instead is elliptically polarized. The cholesteric liquid crystals which exhibit this property of selective reflection of light in a region centered around some wavelength $\lambda o$ are said to be in the Grandjean or disturbed texture. If $\lambda o$ is in the visible spectrum, the liquid crystalline film appears to have the color corresponding to $\lambda 0$ and if $\lambda o$ is outside the visible spectrum, the film appears colorless.

Further, depending upon the intrinsic rotatory sense of the helical nature of the substance, i.e., whether it is right-handed or left-handed, the light that is transmitted in the region about $\lambda o$ is either right hand circularly polarized light (RHCPL) or left hand circularly polarized light (LHCPL). The transmitted light is circularly polarized with the same sense of polarization as that of the sense of the helical nature of the substance. Thus, a cholesteric liquid crystal having an intrinsic helical structure which is right-handed in sense will transmit RHCPL.

Hereinafter these cholesteric liquid crystal substances will be identified in order to conform with popular convention, by the kind of light which is reflected by the particular substance in the region around $\lambda o$. When a substance or a film is said to be right-handed it is meant that it reflects RHCPL and when it is said to be left-handed it is meant that it reflects LHCPL.

A right-handed cholesteric liquid crystal substance transmits LHCPL essentially completely at $\lambda o$ whereas the same substance reflects almost completely RHCPL at $\lambda o$. Conversely, a left-handed film is almost transparent to RHCPL at $\lambda o$ and reflects LHCPL. Since plain polarized or unpolarized light contain equal amounts of RHCPL and LHCPL a cholesteric liquid crystal film is approximately 50 percent transmitting at $\lambda o$ for these sources when the liquid crystal is in its Grandjean or "disturbed" texture. These properties make such cholesteric liquid crystal substances extremely valuable when utilized in optical devices.

The dispersive reflection of a disturbed cholesteric liquid crystal film is described by the equation:

$$\lambda = \lambda_0 \cos \tfrac{1}{2}\left[\text{SIN}^{-1}\left(\frac{\text{SIN } \phi i}{n}\right) + \text{SIN}^{-1}\left(\frac{\text{SIN } \phi s}{n}\right)\right]$$

A detailed discussion of this dispersive reflection phenomenon is given in J. L. Fergason, *Mol. Cryst.* 1, 293 (1966). Where $\phi i$ equals the angle of incidence of the incident light (assuming $\phi i$ for normal incidence equals zero); $\phi s$ equals the angle of reflection of the reflected light; and $\lambda o$ equals the reflected wavelength for the condition where $\phi i$ equals $\phi s$ equals zero. The geometry for this phenomenon is shown in FIG. 1.

It can be seen from the equation set out above that the reflected wavelength is related to the angles $\phi i$ and $\phi s$ and the optical properties of the film. The equation does not take into account the intensity of the incident light. The intensity of a given reflection is a function of the orientation distribution of scattering sites. It has been found that in the disturbed state the distribution of helical axes is predominantly perpendicular to the substrate. Specular and near specular dispersive scattering is large compared to reflections far from specular. Therefore, for normal incidence, i.e., where $\phi i$ equals zero, the wavelengths around $\lambda o$ are most strongly scattered. However, if the film is then tilted with respect to an incident beam of white light such that $\phi i$ is not equal to zero any longer then the wavelength most effectively scattered is given by the equation:

$$\lambda = \lambda_0 \cos\left[\text{SIN}^{-1}\left(\frac{\text{SIN } \phi i}{n}\right)\right]$$

A detailed discussion of this phenomenon is given in *Optical Properties of Certain Cholesteric Liquid Crystal Films*, Adams, Haas and Wysocki, Journal of Chemical Physics, Vol. 50, No. 6, 2458–2464 (1969).

Therefore, rotating a liquid crystal film with respect to an incident light beam constitutes a tuning technique. In the case of a band pass filter which has one liquid crystal film and transmits only one band of wavelengths, the transmitted band can be shifted to another region of the light spectrum. For multiband pass filters which have more than one liquid crystal film and transmit a plurality of bands of wavelengths corresponding to the number of films present, the individual transmitted bands may be shifted independently of each other by rotating one film while maintaining the others in their original position or they may be shifted in tandem by rotating the filter itself.

With respect to optical notch filters which utilize complementary matched pairs of liquid crystal films a variety of results may be achieved by resort to the method of the invention. By a complementary matched pair of liquid crystal films is meant two individual films arranged in a manner such that they both have the same $\lambda o$ value with one being a left-handed film and one being a right-handed film. Of course, both films may have the same intrinsic $\lambda o$ value and thus could both be arranged in the path of the incident light beam in a manner such that the light is directed on the films at normal incidence. Consider, however, a situation where the two films do not have the same intrinsic $\lambda o$ value. In such a case, the reflection spectra of the two individual films may be brought into coincidence by rotating one film while the other is held fixed. At this point the two films would then constitute a complementary matched pair. Of course, with respect to any complementary matched pair of films, whether the individual films which make up the pair are intrinsically matched or matched in the manner described above, the notch itself, i.e., the band of wavelengths which is substantially completely reflected by the filter, can be shifted by rotating the matched pair of films in tandem. Moreover, where this type of filter has a plurality of complementary matched pairs of liquid crystal films so that the filter substantially completely reflects a plurality of wavelength bands the respective reflected bands may be shifted independently or in tandem.

The invention will be more fully appreciated and understood from the following detailed description of various preferred embodiments thereof particularly when read in conjunction with the drawings in which.

Figure 1:
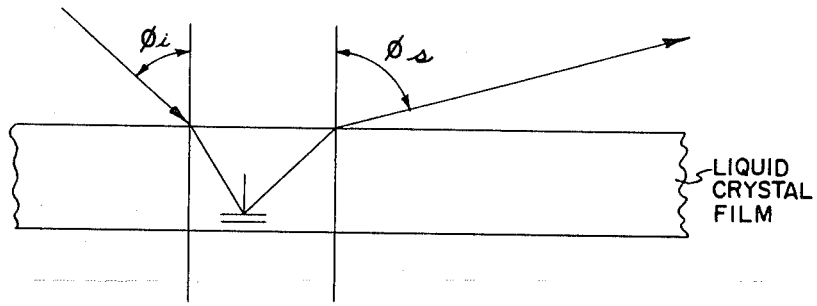
FIG. 1 illustrates the light scattering characteristics of a liquid crystal film having optically negative properties.
Figure 2:
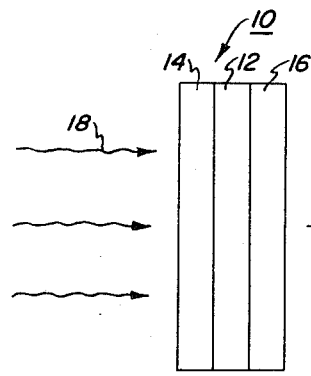
FIG. 2 is a schematic side cross-sectional view of a typical optical band pass filter.

Referring now to FIG. 2 there is seen an exemplary optical band pass filter 10 of the type described in copending application Ser. No. 104,367, filed on Jan. 6, 1971 entitled "Optical Filter System," filed on the same filing date of this instant application and herein incorporated by reference. The filter 10 is shown for purposes of illustration as consisting of a liquid crystal film 12 having optical negative properties, and positioned between a linear polarizer 14 and a linear analyzer 16, the latter two members having a predetermined angular relationship between their axes of polarization such that the cooperative action of these two members is effective to prevent the transmission of incident unpolarized light through the linear analyzer.

Preferably, to obtain optimum results, the optical filter 10 is arranged in the path of the incident light beam, represented by arrows 18, in a manner such that the incident light beam is normal to the liquid crystal film 12. Thus, the emergent beam 20 contains only a wavelength band centered about some wavelength $\lambda o$, the remainder of the wavelengths of radiation within the incident light beam having been extinguished by the cooperative effect of the linear polarizer and the linear analyzer. Of course, $\lambda o$ in any instance is determined by the particular liquid crystal substance, mixture of liquid crystal substances or composition comprising a liquid crystal substance employed for liquid crystal film 12. In this exemplary instance liquid crystal film 12 is comprised of a composition of 23 percent cholesteryl chloride by weight in cholesteryl nonanoate. Details concerning preparation of the optical filter are given in Example I.

Figure 4:
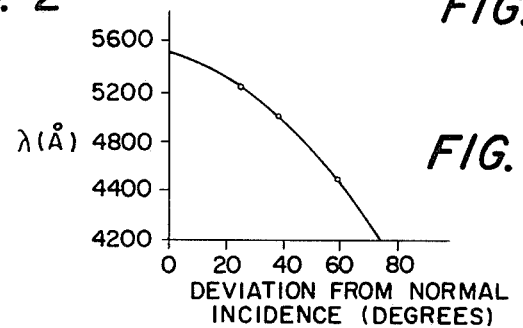
FIG. 4 is a graphical illustration showing the shift in the center wavelength of the transmitted band for a band pass filter for the change in the angular incidence of the incident light beam.

Consider now what occurs when the liquid crystal film 12 is rotated with respect to the incident light beam such that the angular incidence of the light beam on the film deviates from normal incidence. The results obtained are illustrated by FIG. 4. The vertical axis of the graphical illustration is a measure of $\lambda o$ in A whereas the horizontal axis is expressed as the angular deviation, in degrees, from normal incidence of the incident light beam upon the liquid crystal film. Thus, it is seen that at normal incidence $\lambda o$ for the liquid crystal film is about 5500A. When the film 12 is rotated to an extent such that the angular incidence of the incident light beam upon the film deviates from normal incidence by 20° the $\lambda o$ value for the film is shifted to about 5350A. When rotating the liquid crystal film the $\lambda o$ value thereof can be shifted to various other wavelengths as is clearly shown. Although the method has been described with respect to rotating only the liquid crystal film, it should be apparent that for this particular embodiment of band pass filter the same results would be obtained by rotating the filter itself since filter 10 has only one liquid crystal film and further the cooperative action of the linear polarizer and linear analyzer is not greatly affected by modest changes in the angular incidence of the incident light beam.

While optical filter 10 has been shown as having one liquid crystal film it should be recognized that any number of suitable liquid crystal films may be positioned between the linear polarizer and the linear analyzer. When a particular band pass filter does have a plurality of these liquid crystal films selected so as to allow the transmission of a band of wavelengths corresponding to each film, the films will typically be mounted in a manner which permits them to be rotated independently of each other. Thus, it will be clearly apparent that any number of possibilities are present. The transmission bands may be shifted in concert with each other merely by rotating the films together; or one film may be rotated while the others remain fixed thus shifting one band; or more than one film may be rotated while the others remain fixed thus shifting more than one band, etc.

Figure 3:
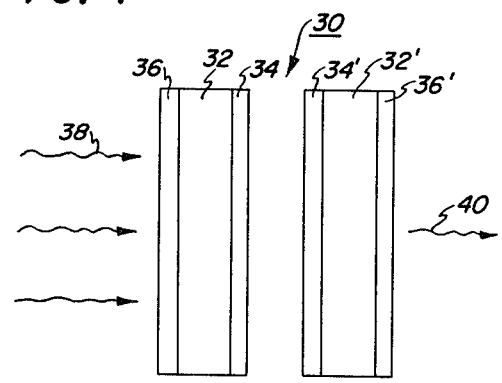
FIG. 3 is a schematic side cross-sectional view of a typical optical notch filter.

Referring now to FIG. 3 there is seen an exemplary optical notch filter 30 of the type described in copending application Ser. No. 104,369, filed on Jan. 6, 1971 entitled "Optical Filter System" filed on the same filing date of this instant application and herein incorporated by reference. The filter 30 is shown for purposes of illustration as having two components. One component has a thin liquid crystal film 32 comprising a composition of 24.5 percent by weight of cholesteryl chloride (CC) in cholesteryl decanoate (CD) positioned between a thin glass plate 34 and thin Mylar sheet 36. This liquid crystal composition is left-handed and has a $\lambda o$ of about 5,200A. The other component has a thin liquid crystal film 32' comprising a composition of 20 percent by weight CC in cholesteryl bromide (CB) positioned between a thin glass plate 34' and a thin Mylar sheet 36'. The liquid crystal composition of the latter component is right-handed and has a $\lambda o$ of about 5,700A. While it is clearly apparent that the two liquid crystal films could be selected to have the same intrisic $\lambda o$ values, i.e., for incident light directed upon them at normal incidence they would reflect the same wavelength band, for purposes of illustrating the invention in this exemplary instance they have been chosen to have different intrinsic $\lambda o$ values. Details concerning the preparation of the filter are shown in Example II.

Figure 5:
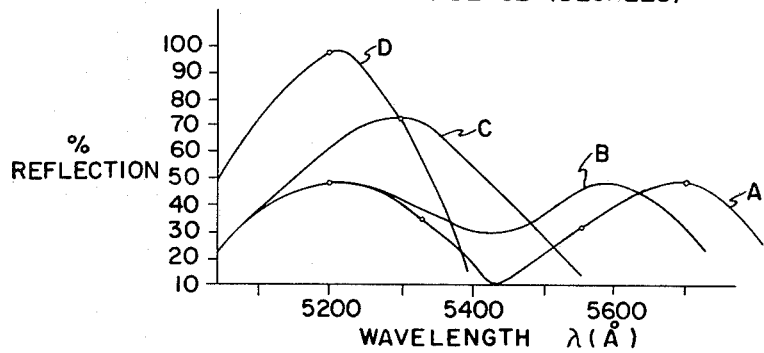
FIG. 5 is a graphical illustration showing the change in the reflection spectrum of a typical optical notch filter as one of the liquid crystal films is rotated with respect to the incident light beam.

The reflection spectra of the optical filter of FIG. 3 for various conditions are shown in FIG. 5 where the percent reflection of the filter is plotted against wavelength (A). Curve A shows the condition of the reflected beam when both films 32 and 32' are positioned in a manner such that the incident light beam, represented by arrows 38 strikes both films at normal incidence. There are seen two discreet wavelength bands, which are partially reflected by the filter, one centered around a wavelength of about 5,200A and corresponding to liquid crystal film 32 with the other centered around a wavelength of about 5,700A and corresponding to liquid crystal film 32'. When liquid crystal film 32' is rotated by 15° and film 32 is held fixed the reflection spectrum of the filter changes. The spectrum for this situation is illustrated by Curve B. Rotating film 32' by 30° while keeping film 32 normal to the light beam produces the reflection spectrum shown in Curve C. Curve D illustrates the result which occurs when film 32' is rotated by 42°. It can be seen that the filter now substantially completely reflects light in the wavelength band centered around 5,200A since the individual reflection spectra of films 32 and 32' have now been brought into coincidence, i.e., both films now reflect the incident light most strongly in the region around 5,200A. Thus, the filter now constitutes a typical optical notch filter since it transmits substantially all of the incident light while simultaneously rejecting substantially completely the wavelengths of light in the narrow band centered around 5,200A. At this condition the emergent beam 40 for optical filter 30 contains all the wavelengths of radiation of the incident light except for the reflected band centered about 5,200A.

Films 32 and 32' have been selected with varying intrinsic $\lambda_0$ values in order to illustrate an embodiment of the invention. Of course, it is apparent that they could be selected so as to have the same intrinsic $\lambda_0$ values. In any event, when the reflection spectra of the two films are coincident, the band of wavelengths which is reflected by the pair can itself be shifted by rotating the pair in tandem.

Moreover, while the optical filter device has been shown as having one pair of liquid crystal films, it is apparent that any number of complementary matched pairs may be stacked in series to form a filter which reflects a plurality of wavelength bands. In a typical optical notch filter of this type the individual films are preferably mounted so as to be rotatable independently of each other. Thus, where a filter is constructed from a plurality of these liquid crystal film pairs, the reflected wavelength bands may be shifted in tandem by rotating the filter itself; or only an individual band may be shifted by rotating one pair while the others are held fixed or more than one may be shifted by rotating more than one pair while holding the others fixed.

Generally speaking, the liquid crystal films of the optical filters described can be rotated to an extent such that the incident light beam deviates from normal incidence by up to 90°. It should be rocognized, however, that as any liquid crystal film is rotated in this manner there is a corresponding gradual deterioration in the bandwidth of the transmitted or reflected wavelength band. For example, at a deviation of 60° from normal incidence the bandwidth is about two times greater than that obtained when the incident light is at normal incidence. Of course, the transmitted or reflected band will disappear completely when the deviation from normal incidence reaches 90°. Moreover, from the foregoing, it can be seen that $\lambda_0$ for any liquid crystal film suitable for use in these optical filters is greatest when the incident light strikes the film at normal incidence. Thus, as any liquid crystal film is rotated in accordance with the method of the invention the $\lambda_0$ value of the film becomes progressively smaller. The shift in $\lambda_0$, in angstroms, for any film which can be achieved through the use of the invention is dependent on the particular liquid crystal film itself. Broadly speaking, the shift in $\lambda_0$ for any film can be any number of angstroms up to $\lambda_0$. It will be appreciated by those skilled in the art then that considerations relating to the shift in the center wavelength of the transmitted or reflected band should be balanced against those relating to the band width of the transmitted or reflected band. In actual practice these considerations will dictate which particular liquid crystalline substances are employed as the films and to what extent they can be rotated to give desired results.

From the foregoing it is readily evident that the method of the invention constitutes an extremely valuable technique for use in accordance with optical filters constructed with suitable liquid crystal films. For these liquid crystal films the relationship of the angular incidence of the incident light beam and $\lambda_0$ is such that a relatively small change in the $\lambda_0$ value of any particular film is obtained for relatively large rotation of the film. Consequently, this tuning technique is a highly sensitive one. Furthermore, when the films are rotated the bandwidth of the transmitted beam in the case of a band pass filter does not deteriorate as rapidly as occurs with prior art filters thus allowing the liquid crystal films to be rotated a relatively large number of degrees. Accordingly, it is therefore possible to shift the $\lambda_0$ for any film over a relatively large range of wavelengths.

The liquid crystal films which are utilized in these optical filters are subject to "drift" in their $\lambda_0$ values, i.e., a slight shift because of the presence of various stimuli such as temperature, chemical vapors, etc. A further advantage of the method of the invention is that it conveniently permits compensation for such drift in the liquid crystal films.

The invention will now be further described with respect to specific preferred embodiments by way of Examples, these being intended to be illustrative only and it being understood that the invention is not limited to the materials, devices and conditions recited therein. All parts given are by weight unless otherwise specified.

The behavior of the optical filters described in the Examples is observed by measuring the transmission spectra of the filters using a Cary Spectrometer. The reflection spectra of the filters are inferred from their transmission spectra since there is only negligible absorption in each case.

EXAMPLE I

A composition of 23 percent cholesteryl chloride (CC) in cholesteryl nonanoate is prepared. The composition has a $\lambda_0$ value of about 5,500A. A thin layer of the liquid crystal composition is applied to a Polaroid sheet and subsequently another Polaroid sheet is placed over the free surface of the liquid crystal layer.

The Polaroid sheets are arranged so that their respective axes of polarization have an angular relationship of about 90° to each other. The optical filter is positioned in the path of a light beam emitted by a broad band incandescent source of visible light so that the incident radiation is at normal incidence to the filter. The filter is then rotated over varying angles and the transmitted wavelength band measured for each position. The results obtained are shown in FIG. 4.

EXAMPLE II

Compositions of 24.5 percent of cholesteryl chloride (CC) in cholesteryl decanoate (CD) and 20 percent CC in cholesteryl bromide (CB) respectively are prepared. The former is a left-handed composition with a $\lambda o$ of about 5,200A while the latter composition is right-handed and has a $\lambda o$ of about 5,700A. A thin layer of one composition is applied to a thin glass plate and a thin Mylar sheet then applied over the free surface of the liquid crystal layer. A thin layer of the second liquid crystal composition is similarly arranged between a thin glass plate and thin Mylar sheet. The two components of the optical filter are then arranged in the path of a light beam emitted from a broad band incandescent source of visible light with the incident light being normal to the filter. The two components of the filter are positioned so that the thin glass plate members of each component are adjacent to each other and further so that they may be rotated independently of each other. The component having the 20 percent CC in CB composition is rotated over varying angles and the transmitted wavelength band measured for each position. The results obtained are shown in FIG. 5.

Although the invention has been described in detail with respect to optical band pass and notch filters constructed in a particular fashion, it should be recognized that the practice of the method disclosed is not limited to these specific filter configurations. The instant method is applicable to any optical device employing one or more liquid crystal films having optically negative characteristics including those now known as well as any which may become known in the future.

While the invention has been described in detail with respect to certain embodiments thereof, it is not intended to be limited thereto but rather it will be appreciated by those skilled in the art that modifications and variations are possible which are within the spirit of the invention and the scope of the claims.

What is claimed is:

1. A method for shifting the plurality of wavelength bands transmitted by an optical filter comprising the steps of:
   a. providing a light source;
   b. providing an optical filter comprising a plurality of liquid crystal films having optically negative characteristics arranged between a linear polarizer member and a linear analyzer member, each said liquid crystal film having a different $\lambda o$ value at the same temperature, where $\lambda o$ is the center wavelength of the wavelength band of radiation reflected by each said liquid crystal film, and means for separating said liquid crystal films, said elements being arranged such that said optical filter is capable of transmitting more wavelength bands of radiation than a similar optical filter having one liquid crystal film;
   c. directing incident radiation from said light source upon said optical filter; and
   d. rotating said optical filter with respect to the angular incidence of said incident radiation whereby the center wavelength of each wavelength band transmitted by the optical filter is changed.

2. The method as defined in claim 1 wherein the respective axes of polarization of said linear polarizer member and said linear analyzer member have an angular relationship of from about 80° to about 100°.

3. The method as defined in claim 1 wherein the respective axes of polarization of said linear polarizer member and said linear analyzer member have an angular relationship of about 90°.

4. The method as defined in claim 1 wherein said incident radiation directed upon said optical filter is initially at normal incidence to each said liquid crystal film of said optical filter.

5. A method for shifting the center wavelength of a wavelength band or plurality of wavelength bands reflected by an optical filter comprising the steps of:
   a. providing a light source;
   b. providing an optical filter comprising at least one complementary matched pair of liquid crystal films having optically negative properties, each said complementary matched pair of liquid crystal films having a different $\lambda o$ value, the two films in each pair having the opposite rotatory sense from each other and being arranged so that incident light in the band centered about some wavelength $\lambda o$ will be essentially completely reflected by said pair while the remainder of the incident light having wavelength outside of the band centered about $\lambda o$ will be essentially completely transmitted by said pair;
   c. directing incident radiation from said light source upon said optical filter; and
   d. rotating said optical filter with respect to the angular incidence of said incident radiation whereby the center wavelength of each wavelength band reflected by the optical filter is changed.

6. The method as defined in claim 5 wherein said incident radiation directed upon said optical filter is initially at normal incidence to each said complementary matched pair of liquid crystal films of said optical filter.

7. The method as defined in claim 6 wherein said optical filter has a plurality of complementary matched pairs of liquid crystal films having optically negative characteristics and at least one of said complementary matched pairs of liquid crystal films is rotated with respect to the angular incidence of said incident light.

8. A method for shifting a plurality of wavelength bands transmitted by an optical filter comprising the steps of:
   a. providing a light source
   b. providing an optical filter comprising at least three liquid crystal films having optically negative characteristics arranged between a linear polarizer member and a linear analyzer member, each said liquid crystal film having a different $\lambda o$ value at the same temperature, where $\lambda o$ is the center wavelength of the wavelength band of radiation reflected by each said liquid crystal film, and means for separating said liquid crystal films, said elements being arranged such that said optical filter is capable of transmitting more wavelength bands of radiation than a similar optical filter having one liquid crystal film c. directing incident radiation from said light source upon said optical filter and d. rotating at least two of said liquid crystal films with respect to the angular incidence of said incident radiation and holding the remainder of said liquid crystal films fixed.

* * * * *